US 8,393,742 B2

(12) United States Patent
Park et al.

(10) Patent No.: US 8,393,742 B2
(45) Date of Patent: *Mar. 12, 2013

(54) EXTERNAL LIGHT SHIELDING FILM FOR DISPLAY APPARATUS, METHOD OF MANUFACTURING THE SAME AND FILTER FOR DISPLAY APPARATUS HAVING THE SAME

(75) Inventors: Dae Chul Park, Suwon-si (KR); Eun Young Cho, Seoul (KR); In Sung Sohn, Seongnam-si (KR); Jae Young Choi, Seoul (KR)

(73) Assignee: Samsung Corning Precision Materials Co., Ltd., Gyeongsangbuk-Do (KR)

(*) Notice: Subject to any disclaimer, the term of this patent is extended or adjusted under 35 U.S.C. 154(b) by 231 days.

This patent is subject to a terminal disclaimer.

(21) Appl. No.: 12/000,122

(22) Filed: Dec. 10, 2007

(65) Prior Publication Data

US 2008/0137222 A1 Jun. 12, 2008

(30) Foreign Application Priority Data

Dec. 12, 2006 (KR) .................. 10-2006-0126506
Dec. 15, 2006 (KR) .................. 10-2006-0128548

(51) Int. Cl.
*G02B 27/00* (2006.01)
(52) U.S. Cl. ......... 359/614; 359/601; 359/613; 359/885
(58) Field of Classification Search .......... 359/599–614, 359/885
See application file for complete search history.

(56) References Cited

U.S. PATENT DOCUMENTS

| | | | | |
|---|---|---|---|---|
| 4,004,851 A * | 1/1977 | Negishi et al. | ............... | 359/614 |
| 4,528,232 A * | 7/1985 | Cliffe | .................. | 428/195.1 |
| 5,204,160 A * | 4/1993 | Rouser | ........................ | 428/167 |
| 5,254,388 A * | 10/1993 | Melby et al. | ............... | 428/120 |
| 5,563,738 A * | 10/1996 | Vance | .......................... | 359/614 |
| 6,406,783 B1* | 6/2002 | Phillips et al. | ............ | 428/317.9 |
| 6,472,765 B1* | 10/2002 | Sano et al. | .................. | 257/787 |
| 6,890,590 B2* | 5/2005 | Lin et al. | ...................... | 427/164 |
| 7,693,389 B2* | 4/2010 | Kamijima | .................... | 385/147 |
| 8,120,864 B2* | 2/2012 | Lee et al. | ...................... | 359/885 |
| 2004/0224187 A1* | 11/2004 | Kang et al. | ................... | 428/697 |
| 2006/0263593 A1* | 11/2006 | Aziz et al. | ..................... | 428/328 |
| 2007/0152555 A1* | 7/2007 | Park et al. | ..................... | 313/112 |
| 2008/0268209 A1* | 10/2008 | Woo et al. | ..................... | 428/192 |
| 2009/0279175 A1* | 11/2009 | Laney et al. | ................. | 359/599 |

FOREIGN PATENT DOCUMENTS

| | | |
|---|---|---|
| JP | 04-009093 | 1/1992 |
| JP | 05-190101 | 7/1993 |
| JP | 06-025918 | 2/1994 |
| JP | 2000-123740 | 4/2000 |
| JP | 2000-352608 | 12/2000 |

(Continued)

*Primary Examiner* — Thong Nguyen
(74) *Attorney, Agent, or Firm* — McDermott Will & Emery LLP

(57) ABSTRACT

Disclosed are an external light shielding film with a substrate including a transparent resin, an external light shielding pattern formed on a surface of the substrate and having a plurality of external light shielding parts including a light absorbing material, a method of manufacturing the external light shielding film, and a filter for a display having the external light shielding film. The light absorbing material consists of a base resin and a light absorbing substance, and at least one of a concentration of the light absorbing substance and a refractive index of the base resin varies in a stepwise manner.

11 Claims, 5 Drawing Sheets

FOREIGN PATENT DOCUMENTS

| | | |
|---|---|---|
| JP | 2001-125202 | 5/2001 |
| JP | 2003-051258 | 2/2003 |
| JP | 2003-058071 | 2/2003 |
| JP | 2004-004148 | 1/2004 |
| JP | 2004-146536 | 5/2004 |
| JP | 2004-226796 | 8/2004 |
| JP | 2005-276810 | 10/2005 |
| JP | 2006-092756 | 4/2006 |
| JP | 2006-189867 | 7/2006 |
| JP | 2006-201577 | 8/2006 |
| JP | 2006-313360 | 11/2006 |
| WO | WO 2005/116740 | * 12/2005 |

* cited by examiner

EXTERNAL LIGHT SHIELDING FILM FOR DISPLAY APPARATUS, METHOD OF MANUFACTURING THE SAME AND FILTER FOR DISPLAY APPARATUS HAVING THE SAME

CROSS-REFERENCE TO RELATED APPLICATION

This application claims the benefit of Korean Patent Application Nos. 10-2006-0126506, filed on Dec. 12, 2006, and 10-2006-0128548, filed on Dec. 15, 2006, in the Korean Intellectual Property Office, the entire disclosure of which is incorporated herein by reference.

BACKGROUND OF THE INVENTION

1. Field of the Invention

The present invention relates to an external light shielding film for a display apparatus, a method of manufacturing the same, and a filter for a display apparatus having the same, and more particularly, to an external light shielding film for a display apparatus, a method of manufacturing the same, and a filter for a display apparatus having the same, which can increase a contrast ratio in a bright room.

2. Description of Related Art

As modern society becomes more information oriented, technology of parts and devices related to image displays is remarkably advancing, and these parts and devices are becoming widespread. Display apparatuses utilizing parts and devices related to photoelectronics are becoming significantly widespread and used for television apparatuses, monitor apparatuses of personal computers, and the like. Also, display apparatuses are becoming both larger and thinner.

Plasma display panel (PDP) apparatuses are generally gaining popularity as next-generation display apparatuses to simultaneously satisfy a trend of becoming larger, and of becoming thinner, when compared with cathode-ray tubes (CRTs) representing existing display apparatuses.

The PDP apparatus generates a gas discharge between electrodes by a direct current (DC) voltage or an alternating current (AC) voltage which are supplied to the electrodes. Here, ultraviolet light is generated. Then, a phosphor is exited by ultraviolet light, thereby emitting light. However, the PDP apparatus has a defect in that an amount of emitted electromagnetic (EM) radiation and near infrared (NIR) radiation with respect to a driving characteristic is great, surface reflectivity of the phosphor is great, and color purity due to orange light emitted from helium (He), or xenon (Xe) used as a sealing gas is lower than the CRT. Accordingly, EM radiation and NI radiation generated in the PDP apparatus may have harmful effects on human bodies, and cause sensitive equipment such as wireless telephones, remote controls, and the like, to malfunction.

Therefore, in order to use the PDP apparatus, it is required to prevent emission of EM radiation and NI radiation emitted from the PDP apparatus from increasing to more than a predetermined level. PDP filters having functions such as an EM radiation-shielding function, an NI radiation-shielding function, a surface antiglare function, enhancement of color purity, and the like, are used for EM radiation-shielding and NI radiation-shielding while simultaneously reducing reflected light, and enhancing color purity. Since the PDP filter is equipped in a front unit of the panel assembly, transparency is required to simultaneously emit light and perform shielding functions.

External light may enter the panel assembly passing through the PDP filter in a condition where an outer surface is bright, that is, in a bright room condition with the PDP apparatus according to the conventional art. Accordingly, an overlapping between incident light generated in the discharge space of the panel assembly, and the external light entered passing through the PDP filter from the outer surface occurs. Accordingly, a contrast ratio decreases in the bright room condition, and therefore screen display capacity of the PDP apparatus is deteriorated. In order to overcome the above-mentioned problems, a PDP filter including an external light shielding film which is filled with a light absorbing substance so as to absorb external light has been disclosed.

In the case where external light is absorbed by an external light shielding film filled with a light absorbing substance, when the external light shielding film is filled with a large quantity of the light absorbing substance, problems of the contrast ratio becoming decreased in the bright room condition, and the screen display capacity becoming deteriorated may be solved. However, since the external light shielding film is not completely filled with the light absorbing substance in a general filling process, a filling defect caused by the light absorbing substance being exposed as is on an outer surface of the display apparatus, thereby generating a line shaped defect on the display.

Also, a visible ray transmittance and a viewing angle of the display apparatus are reduced due to the above-mentioned problems.

SUMMARY OF THE INVENTION

An aspect of the present invention provides an external light shielding film for a display apparatus, in which an external light shielding pattern is filled with a light absorbing material by performing a plurality of filling processes, thereby preventing external light from entering into a panel assembly, and increasing a contrast ratio of the display apparatus in a bright room.

An aspect of the present invention provides an external light shielding film for a display apparatus, in which a wedge-shaped external light shielding part is formed, and visible rays generated in each discharge cell are focused and emitted by using total reflection on an inclined surface of the external light shielding part, thereby increasing a light transmittance, and improving brightness of the display apparatus.

An aspect of the present invention provides an external light shielding film for a display apparatus, in which the external light shielding pattern is completely filled with a light absorbing material by performing a plurality of filling processes, thereby preventing distortion of the image quality.

An aspect of the present invention provides an external light shielding film for a display apparatus, in which a defect rate in the filling process of a light absorbing material is reduced by performing a plurality of filling processes, thereby allowing the external light shielding film to be applied to various display apparatuses.

Another aspect of the present invention provides an external light shielding film for a display apparatus, in which the external light shielding pattern is stably filled with a light absorbing material, thereby improving a contrast ratio in a bright room, improving visible ray transmittance of the film and viewing angle characteristics, and improving visibility of the display apparatus.

Another aspect of the present invention provides a method of manufacturing the external light shielding film, in which the external light shielding pattern formed on the external light shielding film is stably filled with the light absorbing material, thereby allowing the external light shielding pattern to have various concentrations and refractive indexes.

Another aspect of the present invention provides a filter for a display apparatus having the external light shielding film.

According to an aspect of the present invention, there is provided a method of manufacturing an external light shielding film, which comprises forming an external light shielding pattern on a surface of a substrate including a transparent resin; and injecting a light absorbing material consisting of a base resin and a light-absorbing substance to the inside of the external light shielding pattern, wherein the injection is performed twice or more.

According to another aspect of the present invention, there is provided a method of manufacturing an external light shielding film, which comprises forming a groove pattern on a surface of a substrate including a transparent resin in a predetermined shape; injecting a light absorbing material consisting of a base resin and a light absorbing substance to the inside of the groove pattern, so that at least one of a concentration of the light absorbing substance and a refractive index of the base resin varies in a stepwise manner; and hardening the base resin.

According to another aspect of the present invention, there is provided an external light shielding film, which comprises a substrate including a transparent resin; and an external light shielding pattern formed on a surface of the substrate and having a plurality of external light shielding parts including a light absorbing material. In this instance, the light absorbing material consists of a base resin and a light absorbing substance and is injected to the inside of each of the plurality of external light shielding parts, and at least one of a concentration of the light absorbing substance and a refractive index of the base resin varies in a stepwise manner.

In this instance, the plurality of external light shielding parts are arranged in parallel with one another on the surface of the substrate, and each of the plurality of external light shielding parts is formed in a wedge shape having a bottom surface exposed to the outside of the substrate and an inclined surface extended from the bottom surface to the inside of the of the substrate.

According to another aspect of the present invention, there is provided a filter for a display apparatus, which comprises a filter base; and an external light shielding film formed on a portion of the filter base. In this instance, the external light shielding film includes a substrate including a transparent resin, and an external light shielding pattern formed on a surface of the substrate and having a plurality of external light shielding parts including a light absorbing material. In this instance, the light absorbing material consists of a base resin and a light-absorbing substance and is injected to the inside of each of the plurality of external light shielding parts, and at least one of a concentration of light absorbing substance and a refractive index of the base resin varies in a stepwise manner.

The display apparatus according to the present invention may be diversely applied to large-sized display apparatuses such as plasma display panel (PDP, hereinafter referred to as 'PDP') apparatuses having pixels formed in a lattice pattern to implement RGB, organic light emitting diode (OLED) apparatuses, liquid crystal display (LCD) apparatuses, field emission display (FED) apparatuses, and the like; and small-size mobile display apparatuses such as personal digital assistants (PDP), display windows of small-sized games, display windows of mobile phones, and the like; and flexible display apparatuses. In particular, the external light shielding film according to the present invention may be effectively applied to a display apparatus for outdoor use where external light is relatively strong and a display apparatus installed in indoor public facilities. For convenience of description, exemplary embodiments of the present invention will be described hereinafter by using a PDP apparatus and a PDP filter for the PDP apparatus, but the embodiments are not limited thereto. The present invention may be applied to various kinds of display apparatuses and the filters for the display apparatus as described above.

BRIEF DESCRIPTION OF THE DRAWINGS

The above and other aspects of the present invention will become apparent and more readily appreciated from the following detailed description of certain exemplary embodiments of the invention, taken in conjunction with the accompanying drawings of which.

DETAILED DESCRIPTION OF EXEMPLARY EMBODIMENTS

Figure 1:
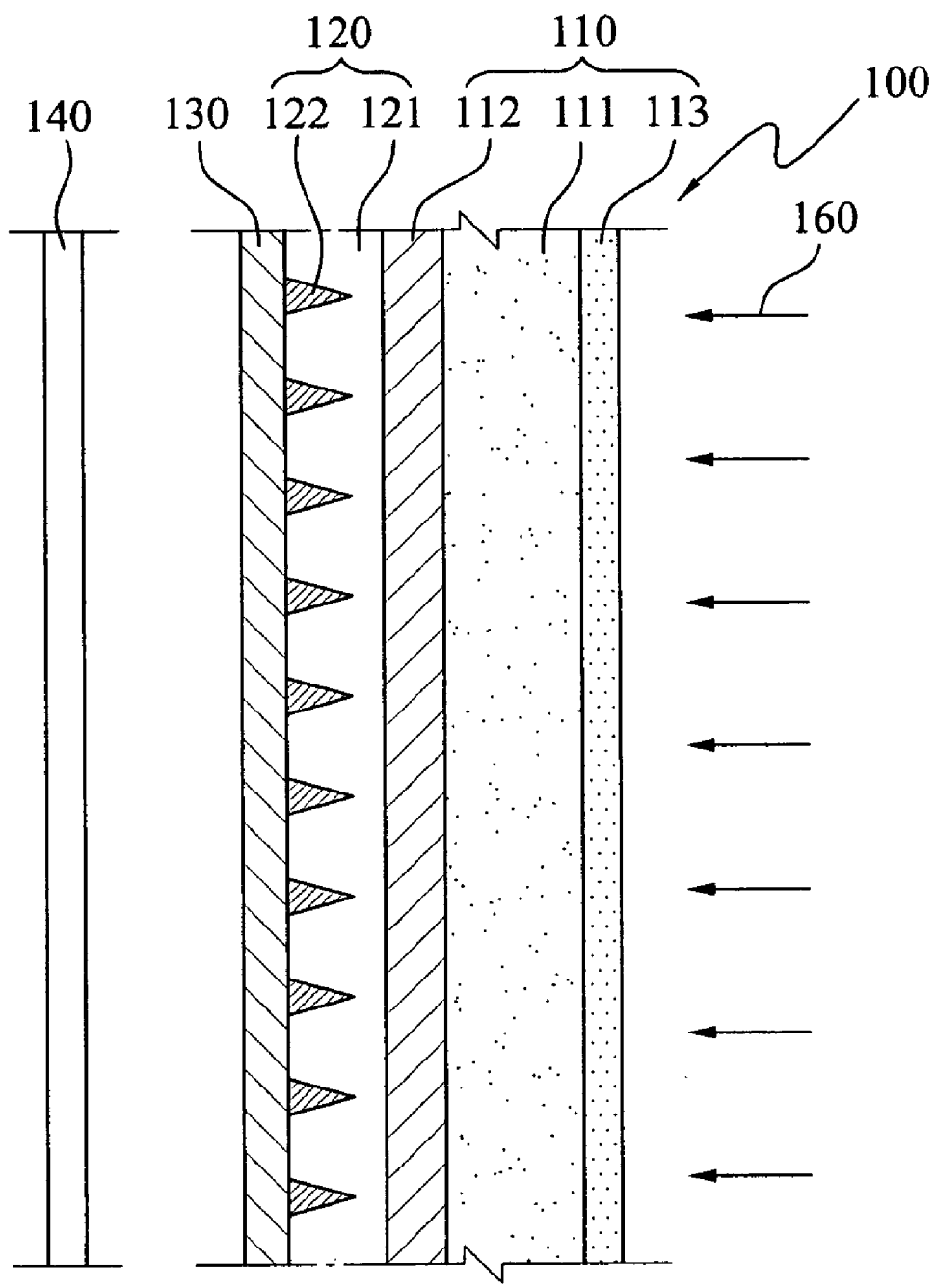
FIG. 1 is a cross-sectional view illustrating a plasma display panel (PDP) filter according to an exemplary embodiment of the present invention.

Reference will now be made in detail to exemplary embodiments of the present invention, examples of which are illustrated in the accompanying drawings, wherein like reference numerals refer to the like elements throughout. The exemplary embodiments are described below in order to explain the present invention by referring to the figures.

FIG. 1 is a cross-sectional view illustrating a plasma display panel (hereinafter referred to as 'PDP') filter 100 according to an exemplary embodiment of the present invention.

Referring to FIG. 1, the PDP filter 100 according to the present exemplary embodiment of the invention includes a filter base 110 provided with a transparent substrate 111 and a plurality of layers having various shielding functions formed on the transparent substrate 111, and an external light shielding film 120.

Here, the filter base 110 is formed of the transparent substrate 111, an anti-reflection film 113, and an electromagnetic wave shielding film 112 stacked one over another regardless of the stated order. Hereinafter, the electromagnetic wave shielding film 112 and the anti-reflection film 113 are separately provided according to the present exemplary embodiment of the invention, however, the present invention is not limited thereto. Specifically, the filter base 110 of the present exemplary embodiment of the invention may be formed of at least one film, and each film may have at least one of an electromagnetic wave function, an anti-reflection function, and any combination thereof.

Also, an external light shielding film 120 may be equipped on a surface of the filter base 110. As illustrated in FIG. 1, the external light shielding film 120 of the present exemplary embodiment of the invention is disposed on a surface of the filter base 110 which is present in a side of a panel assembly 140, that is, a side opposite to a viewer side when the PDP filter 100 is equipped in a PDP apparatus, however, the present invention is not limited thereto. Thus, even in the case where the external light shielding film 120 is disposed on another surface of the filter base 110, equivalent operations and effects may be acquired.

The external light shielding film 120, manufactured by a method of manufacturing an external light shielding film according to an exemplary embodiment of the present invention, includes an external light shielding pattern 122 for shielding external light entering from the outside to the panel assembly 140. The external light shielding pattern 122 of the present exemplary embodiment of the invention is formed on a surface of the external light shielding film 120, however, the present invention is not limited thereto. That is, the external light shielding pattern 122 may be formed on both surfaces of the external light shielding film 120. Also, the external light shielding pattern 122 of the present exemplary embodiment is formed of a plurality of black stripes which are spaced apart from each other by a predetermined distance. However, a form of the external light shielding pattern 122 may be diversely designed.

Also, the external light shielding film 120 may be directly formed on the filter base 110, however, may be formed on a support body (not shown) for supporting the external light shielding film 120 and then being combined with the filter base 110. The support body of the present exemplary embodiment is preferably a transparent resin film having an ultraviolet transmittance. For the support body, polyethylene terephthalate (PET), polycarbonate (PC), polyvinyl chloride (PVC), and the like may be used. Also, the support body may be a film having an inherent function of a filter, for example, a film made of the same material as that of the electromagnetic shielding film 112, the anti-reflection film 113, or a color correction film (not shown). The color correction film functions to correct a specific color of an incident light emitting from the panel assembly, and is disposed on a surface of the external light shielding film. However, unlike this, the color correction film may be included in the filter base.

According to the present exemplary embodiment of the invention, a substrate 121 of the external light shielding film 120 includes an ultraviolet curable resin, and the external light shielding pattern 122 may be formed by a roll forming method, a heat-press method using a thermoplastic resin, or an injection molding method. Also, when the ultraviolet curable resin consisting of the substrate 121 has an anti-reflection function, an electromagnetic wave shielding function, a color correction function, or any combination thereof, the external light shielding film 120 may additionally perform the above functions. For this purpose, the ultraviolet curable resin may include shielding substances such as conductive high polymer, conductive metal, and the like so as to shield an electromagnetic wave, and further include a coloring agent capable of absorbing a specific wavelength area.

The substrate 121 may be directly adhered to the filter base 110. Or, the support body is formed on a surface of the filter base 110, and then the substrate 121 is formed on the support body. Since the support body functions to support the substrate 121, when the external light shielding film 120 is disposed on another surface of the filter base 110 which is different from a surface of the filter base 110 where the support body is formed, a separate substrate (not shown) and a filter base 110 are directly combined with each other without the support body. Also, the substrate 121 is disposed in parallel to the panel assembly opposing the panel assembly, and may include at least one of a black inorganic substance, a black organic substance, and a metal which are capable of absorbing light, so that external light 160 is prevented from entering into the inside of the panel assembly 140.

A color correction film 130 may be stacked on the external light shielding film 120 stacked on the above-mentioned filter base 110. Various kinds of coloring agents capable of increasing a color gamut of a display and improving image resolution may be used for the color correction film 130. Dyes or pigments may be used for the coloring agent. As the examples of the coloring agent, an organic coloring agent having neon light-shielding function, such as anthraquinone, cyanine, azo, stilbene, phthalocyanine, methine, and the like, may be used, and the present invention is not limited thereto. Since kinds and concentrations of the coloring agents are determined by absorption wavelength, absorption coefficients, and transmittance characteristics required for displays, various numerical values may be used without being limited to a specific value.

When each layer or each film of the PDP filter according to the present exemplary embodiment of the invention is stuck together, a transparent gluing agent or adhesive may be used. Examples of the agents may include an acrylic based adhesive, a silicon based adhesive, a urethane based adhesive, a polyvinyl butyral based adhesive (PMB), an ethylene-vinyl acetate based adhesive (EVA), a polyvinyl ether, a saturated amorphous polyester, a melamine resin, and the like.

The external light shielding film 120 of the exemplary embodiment absorbs external light to thereby prevent the external light from entering into the panel assembly 140, and totally reflects incident light emitting from the panel assembly 140 to a viewer side. As a result, a superior visible ray transmittance and a superior contrast ratio can be acquired. Also, according to the present exemplary embodiment of the invention, a defect rate in the filling process of a light absorbing material is reduced by performing a plurality of filling processes, thereby allowing the external light shielding film to be applied to various display apparatuses. Hereinafter, the above-mentioned external light shielding film 120 and the method of the manufacturing of the external light shielding film 120 will be described in detail with reference to FIGS. 2 and 3.

Figure 2:
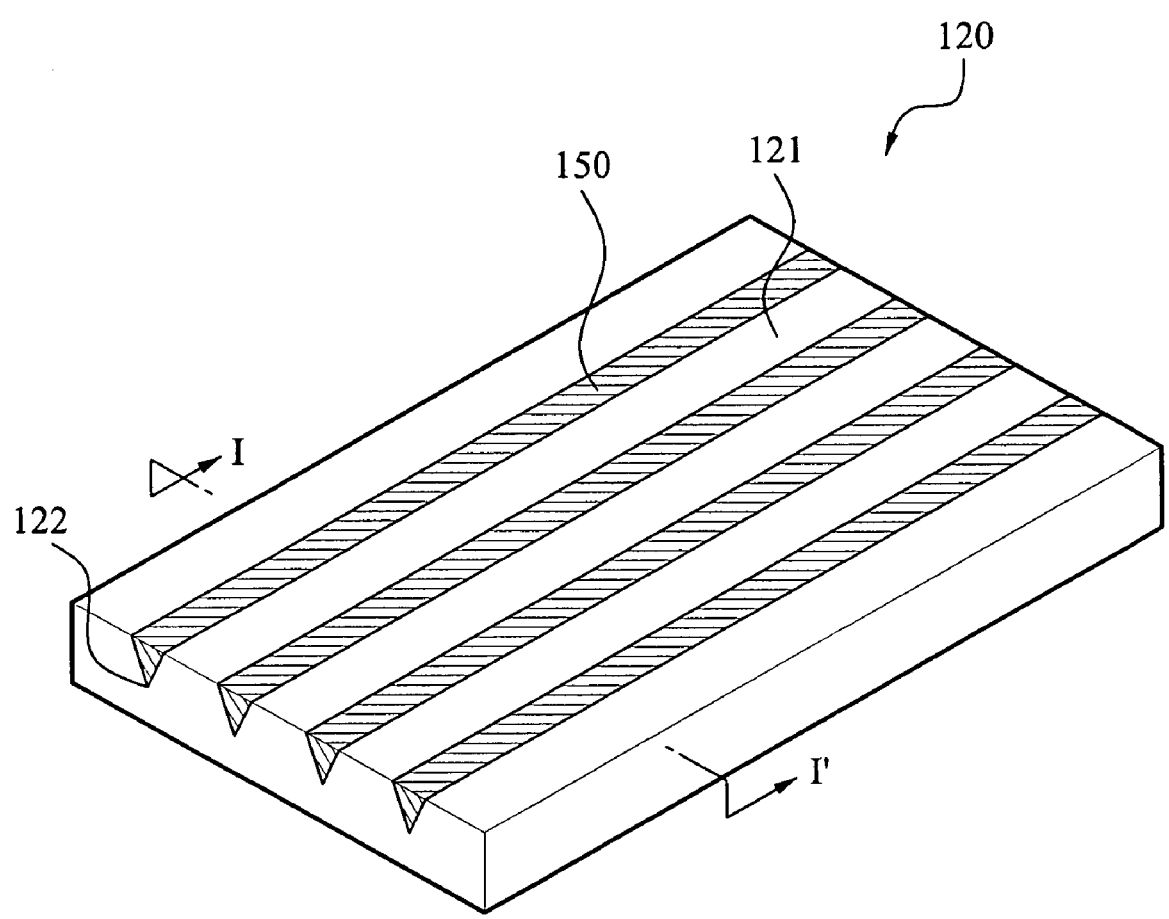
FIG. 2 is a perspective view illustrating an external light shielding film for a display apparatus according to an exemplary embodiment of the present invention.

Referring to FIG. 2, the external light shielding film 120 includes the transparent resin substrate 121 and a plurality of external light shielding parts 150 formed on a surface of the substrate 121 and including a light absorbing material. The substrate 121 includes the external light shielding pattern 122 and is consisted of an ultraviolet curable resin. The external light shielding pattern 122 may be formed by a roll forming method, a heat-press method using a thermoplastic resin, or an injection molding method. Also, when the ultraviolet curable resin consisting of the substrate 121 has an anti-reflection function, an electromagnetic wave shielding function, a color correction function, or any combination thereof, the external light shielding film 120 may additionally perform the above functions. For this purpose, the ultraviolet curable resin may include shielding substances such as conductive high polymer, conductive metal, and the like so as to shield an electromagnetic wave, and further include a coloring agent capable of absorbing a specific wavelength area.

The plurality of external light shielding parts 150 are arranged in parallel with one another on a surface of the substrate, and each of the plurality of external light shielding parts 150 is formed in a wedge shape having a bottom surface exposed to the outside of the substrate and an inclined surface extended from the bottom surface to the inside of the of the substrate. Specifically, the plurality of external light shielding parts 150 has a stripe shaped-pattern parallel to a longitudinal side of the external light shielding film 120 in its top view, however, the present invention is not limited thereto. Thus, each of the plurality of external light shielding parts 150 may have a trapezoidal form in its cross-sectional shape, and the external light shielding pattern may also have various shapes.

The external light shielding pattern 122 may be formed by a roll forming method, a heat-press method using a thermoplastic resin, or an injection molding method. Also, preferably, in forming the external light shielding pattern, an imprint roll where an imprint pattern corresponding to the external light shielding pattern is formed is rolled on the transparent resin of the substrate, so that the external light shielding pattern is transcribed on the transparent resin.

The external light shielding film 120 is manufactured such that a predetermined shaped-groove pattern is formed on a surface of the substrate 121 including the transparent resin. Next, the light absorbing material consisting of a base resin and a light absorbing substance is injected to the inside of the groove pattern. Next, the light absorbing material is hardened, thereby forming the external light shielding film 120. As an example of the light absorbing material, a carbon black is generally used, however, the present invention is not limited thereto. Thus, the light absorbing material may include any one of a black inorganic substance, a black organic substance, and a metal. According to the present exemplary embodiment of the invention, the groove pattern includes a plurality of wedge-shaped grooves. In the external light shielding film 120 of the present exemplary embodiment of the invention, the external light shielding pattern is filled with the light absorbing material by performing a plurality of filling processes. According to the present exemplary embodiment of the invention, the external light shielding pattern is completely filled with the light absorbing material by performing the plurality of filling processes, thereby preventing distortion of the image quality occurring due to refraction of light, which leads to reduction in the defect rate.

Hereinafter, a method of forming the plurality of external light shielding parts will be described in detail.

Figure 3:
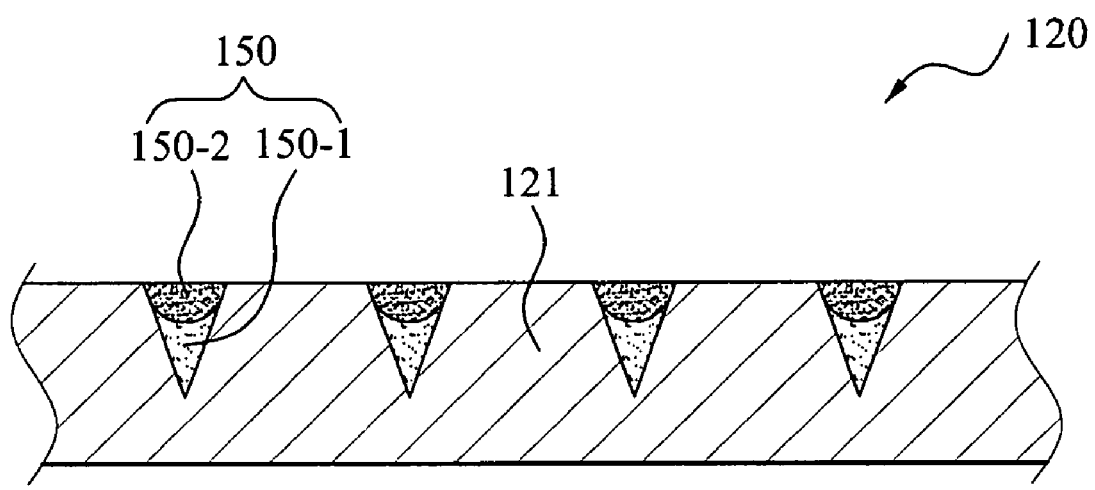
FIG. 3 is a cross-sectional view taken along line I-I' of FIG. 2.
Figure 4:
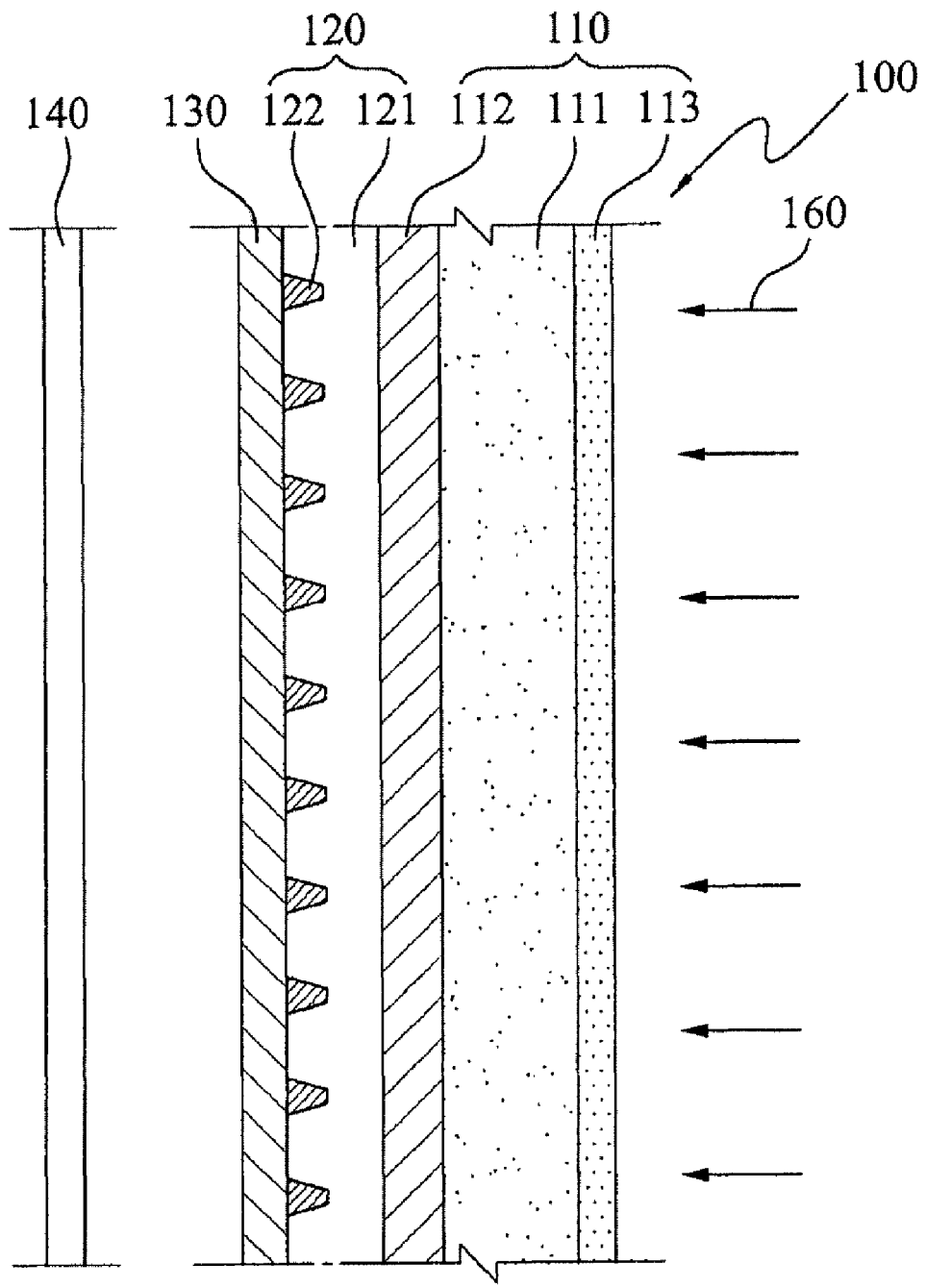
FIG. 4 is a cross-sectional view of external light shielding parts having a trapezoidal cross-sectional shape.
Figure 5:
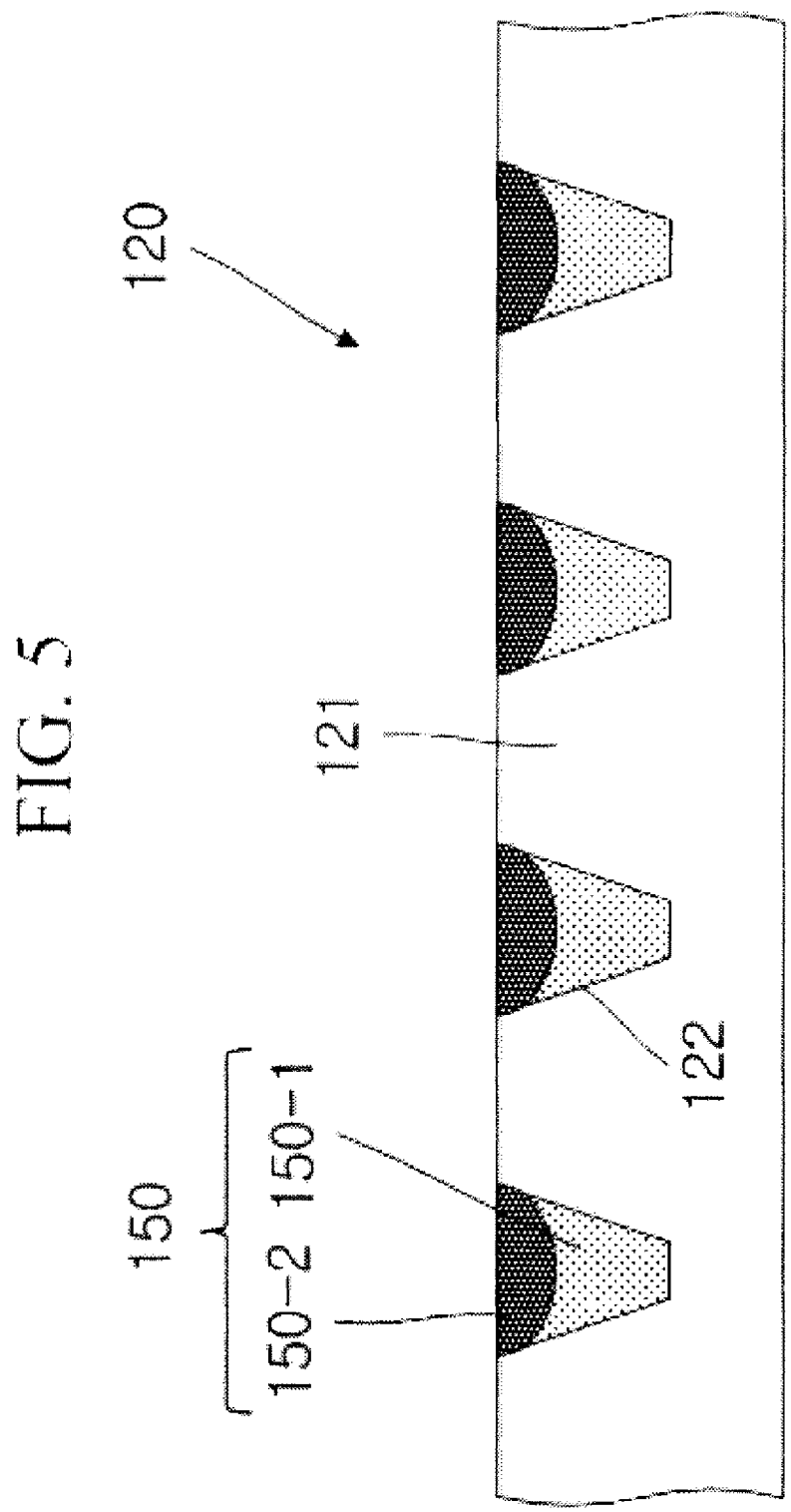
FIG. 5 is a detailed view of a light shielding pattern of the FIG. 4.

FIG. 3 is a cross-sectional view taken along line I-I' of FIG. 2.

Referring to FIG. 3, the plurality of external light shielding parts 150 are formed such that the groove pattern of the external light shielding pattern is filled with the light absorbing material consisting of a base resin and a light-absorbing substance by performing a plurality of filling processes. That is, the light absorbing material is injected to the inside of the groove pattern several times. First, a first external light shielding part 150-1 is formed by performing a first filling process where the light absorbing material is injected to the inside of the groove pattern. Next, a second external shielding part 150-2 is formed by performing a second filling process. Subsequently, a third filling process, a fourth filling process, and the like are performed until the external light shielding parts are completely filled with the light absorbing material. As illustrated in FIG. 3, the first external light shielding part 150-1 and the second external shielding part 150-2 appear to be different substances from each other for the convenience of their explanation, however, may be filled with the same light absorbing material.

As an example of the light absorbing material, a carbon black is generally used, however, the present invention is not limited thereto. Thus, the light absorbing may include any one of a black inorganic substance, a black organic substance, and a metal.

According to the present exemplary embodiment of the invention, the groove pattern is filled with the same light absorbing material by performing the plurality of filling processes. However, according to another exemplary embodiment of the invention, the groove pattern may be filled with light absorbing materials by varying a concentration of the light absorbing material during performing the plurality of filling processes. Also, the groove may be filled with the light absorbing material by varying a refractive index of the base resin of the light absorbing material. A refractive index of the base resin varies in the first external light shielding part 150-1 and the second external light shielding part 150-2, respectively, so that refraction, focusing, and total reflection of visible rays can be improved in comparison with an area of light absorbing range.

Through the above-described plurality of filling processes, the wedge-shaped grooves of the external light shielding pattern 122 is completely filled with the light absorbing material.

Also, the plurality of external light shielding parts 150 may be formed such that the wedge-shaped groove is filled with the light absorbing material by varying at least one of a concentration of the light absorbing substance and a refractive index of the base resin varies in a stepwise manner. The concentration of the light absorbing substance denotes a weight ratio of the light absorbing substance with respect to the base resin. As an example of the light absorbing substance, a carbon black is generally used, however, the present invention is not limited thereto. Thus, the light absorbing substance may include any one of a black inorganic substance, a black organic substance, and a metal.

According to the present exemplary embodiment of the invention, the wedge-shaped groove is filled with the light absorbing material by varying at least one of the concentration of the light absorbing substance and the refractive index of the base resin several times in a stepwise manner. The first external light shielding part 150-1 is formed by injecting a light absorbing material having a relatively low concentration to the inside of the wedge-shaped groove at least one time. The second external light shielding part 150-2 is formed by injecting a light absorbing material having a relatively high concentration to the inside of the wedge-shaped groove at least one time. As the concentration of the light absorbing substance becomes higher, a viscosity of the light absorbing material becomes greater. As a result, filling towards a top end of the wedge-shaped groove becomes incomplete, and thus, there are top limits to the concentration of the light absorbing substance capable of filling the wedge shaped groove. Accordingly, when the filling processes are performed in a plurality of times and in a stepwise manner, the filling processes performed towards the top end of the wedge-shaped groove are readily performed, and a bottom surface of the wedge-shaped groove having a relatively great width is filled with a light absorbing material having a higher concentration of the light absorbing substance exceeding the conventional concentration capable of filling the wedge shaped groove, thereby improving an external light shielding function. Also, since the first external light shielding part 150-1 is filled with a light absorbing material having a relatively low concentration, visible rays emitting from the panel assembly is transmitted, thereby improving a vertical viewing angle. Also, when the refractive index of the base resin is less than that of the substrate 121, the visible rays emitting from the panel assembly are totally reflected to a viewer side, thereby increasing brightness and a viewing angle of the display apparatus. The refractive index of the substrate 121 including a general ultraviolet curable resin is about 1.56, and the refractive index of the base resin is lower than that of the substrate 121 by 0.01 to 0.5, approximately.

The refractive index of the base resin varies in the first external light shielding part 150-1 and the second external light shielding part 150-2, respectively, so that refraction, focusing, and total reflection of visible rays can be improved in comparison with an area of light absorbing range. When the refractive index of the base resin of the second external light shielding part 150-2 is lower than those of the first external light shielding part 150-1 and the substrate 121, the visible rays emitting from the panel assembly is totally reflected at least one time, thereby increasing brightness of the display. When an area of the light absorbing range occupies about 30% of the total display area, a visible ray transmittance is about 70% or less in a conventional art, however, the visible ray transmittance is about 70% or more in the present invention, thereby improving a contrast ratio in a bright room. Each light absorbing material of the first external light shielding part 150-1 and the second external light shielding part 150-2 is applied by varying only the concentration of the light absorbing substance, by varying only the refractive index of the base resin, or by varying both the concentration of the light absorbing substance and the refractive index of the base resin.

According to the present exemplary embodiment of the invention, the first external light shielding part 150-1 and the second external light shielding part 150-2 are separately formed, however, the present invention is not limited thereto. The plurality of external light shielding parts may have at least two external light shielding ranges formed by varying at least one of the concentration of the light absorbing substance and the refractive index of the base resin.

According to the present exemplary embodiment of the invention, the concentration of the light absorbing substance is increased and the refractive index of the base resin is reduced from the inside of each of the plurality of the external light shielding parts 150 to the bottom surface thereof in a stepwise manner, respectively. Conversely, the concentration may be reduced and the refractive index may be increased from the inside thereof to the bottom surface thereof in a stepwise manner, respectively. The concentration and the refractive index may be simultaneously increased, or reduced in a direction perpendicular to the surface of the substrate, as necessary.

Modeling conditions of an external light shielding film including a wedge-shaped black stripe pattern which is filled with a light absorbing material, and the results, that is, contrast ratio in a bright room and a transmittance are shown in Table 1.

An interval between the black stripes was about 107.5 μm, and a refractive index of the substrate 121 was about 1.56. An angle of a trapezoidal-shaped taper denotes an angle formed between the inclined surface of the wedge shaped-pattern and a normal of a light-emitting face. An aperture ratio denotes a ratio of remaining parts other than the plurality of external light shielding parts to the total display area. In Example 1, a concentration of the light absorbing substance of the first external light shielding part 150-1 was about 30 mm$^{-1}$, and a refractive index of the base resin thereof was about 1.55. Also, in Example 1, a concentration of the light absorbing substance of the second external light shielding part 150-2 was about 10/3 mm$^{-1}$, and a refractive index of the base resin thereof is about 1.54. The concentration of the light absorbing substance denotes an optical path length advanced until light is completely absorbed. Here, the concentration of 30 mm$^{-1}$ denotes that light is advanced by 30 mm within the light absorbing substance, and then is completely absorbed and dissipated. In Example 1, the concentration of the first external light shielding part 150-1 was 30 mm$^{-1}$, and the concentration of the second external light shielding part 150-2 was 10/3 mm$^{-1}$, which means that the concentration of the second external light shielding part 150-2 is nine times greater than that of the first external light shielding part 150-1.

In Comparative Examples 1 to 3, a concentration and a refractive index of the light absorbing material are constant. A contrast ratio in a bright room denotes a value obtained when the sum of brightness of black light and brightness of reflected light is divided into the sum of brightness of white light and brightness of reflected light.

TABLE 1

|  | Example 1 | | | | |
| --- | --- | --- | --- | --- | --- |
|  | First external light shielding part | Second external light shielding part | Comparative Example 1 | Comparative Example 2 | Comparative Example 3 |
| Concentration of light absorbing material (mm$^{-1}$) | 30 | 10/3 | 30 | 30 | 30 |
| Refractive index of light absorbing material | 1.55 | 1.54 | 1.55 | 1.55 | 1.55 |
| aperture ratio | 70% | | 67% | 64% | 70% |
| Taper angle | 4.5° | | 4.5° | 4.5° | 5.5° |
| Contrast ratio in a bright room | 316.5:1 | | 261.6:1 | 270.2:1 | 255.6:1 |
| Transmittance | 64.3% | | 64.9% | 61.2% | 69.7% |

As can be seen in Table 1, when comparing Example 1 with Comparative Examples 1 to 3, the contrast ratio in Example 1 was greater than that in Comparative Examples 1 to 3. Specifically, when a transmittance and a viewing angle had a similar level, the contrast ratio was great. In this regard, it was found that if the contrast ratio have a similar level, the transmittance and the viewing angle could be improved, which means that visibility could be improved without reduction in the contrast ratio.

As described above, according to the present invention, the external light shielding pattern is filled with the light absorbing material by performing a plurality of filling processes, thereby preventing external light from entering into the panel assembly, and increasing a contrast ratio of the display apparatus in a bright room.

According to the present invention, a wedge-shaped external light shielding part is formed, and visible rays generated in each discharge cell are focused and emitted by using total reflection on an inclined surface of the external light shielding part, thereby increasing a light transmittance, and improving brightness of the display apparatus.

According to the present invention, the external light shielding pattern is completely filled with a light absorbing material by performing a plurality of filling processes, thereby preventing distortion of the image quality.

According to the present invention, a defect rate in the filling process of a light absorbing material is reduced by performing a plurality of filling processes, thereby allowing the external light shielding film to be applied to various display apparatuses.

According to the present invention, the groove pattern of the external light shielding film is filled in a stepwise manner with the light absorbing material having concentrations from a relatively low concentration to a relatively high concentration, thereby improving an external light shielding effect.

According to the present invention, a transmittance of light emitting from the panel assembly is improved by the light absorbing material having a relatively low concentration, thereby increasing the contrast ratio of the display apparatus in a bright room. Also, the light emitting from the panel assembly is totally reflected by reducing the refractive index of the light absorbing material, thereby improving the transmittance and the viewing angle of the display.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. An external light shielding film, comprising:
   a substrate including a transparent resin and having a plurality of grooves in a surface of the substrate; and
   a plurality of external light shielding parts configured to fill the plurality of grooves respectively and absorb external light, each of the external light shielding parts containing a light absorbing material, wherein:
   the light absorbing material includes a base resin and a light absorbing substance of black color,
   each of the plurality of external light shielding parts includes a first external light shielding part and a second external light shielding part disposed in this order in a direction of the external light, and
   a weight ratio of the light absorbing substance to the base resin of the second external light shielding part is higher than a weight ratio of the light absorbing substance to the base resin of the first external light shielding part.

2. The film of claim 1, wherein the plurality of external light shielding parts are arranged in parallel with one another on the surface of the substrate, and each of the plurality of external light shielding parts is formed in a wedge shape having a bottom surface exposed to the outside of the substrate and an inclined surface extended from the bottom surface to the inside of the substrate.

3. The film of claim 1, wherein each of the plurality of external light shielding parts has a trapezoidal form in its cross-sectional shape.

4. The film of claim 1, wherein the light absorbing substance includes a carbon black.

5. The film of claim 1, wherein the substrate includes a light curable resin.

6. The film of claim 1, wherein a refractive index of the base resin is either increased or reduced in a stepwise manner in a direction perpendicular to the surface of the substrate.

7. The film of claim 1, wherein a refractive index of the base resin is less than a refractive index of the substrate, and a difference between the refractive index of the base resin and the refractive index of the substrate is about 0.01 to 0.5.

8. A filter for a display apparatus, the filter comprising:
   a filter base; and
   an external light shielding film formed on the filter base, the external light shielding film including i) a substrate including a transparent resin and having a plurality of grooves in a surface of the substrate, and ii) a plurality of external light shielding parts configured to fill the plurality of grooves respectively and absorb external light, each of the external light shielding parts containing a light absorbing material, wherein:
   the light absorbing material includes a base resin and a light absorbing substance of black color,
   each of the plurality of external light shielding parts includes a first external light shielding part and a second external light shielding part in this order in a direction of the external light, and
   a weight ratio of the light absorbing substance to the base resin of the second external light shielding part is higher than a weight ratio of the light absorbing substance to the base resin of the first external light shielding part.

9. The filter of claim 8, wherein the filter base includes:
   a transparent substrate;
   an electromagnetic wave shielding film disposed on one surface of the transparent substrate and adapted to shield an electromagnetic wave generated from a panel assembly; and
   an anti-reflection film disposed on the other surface of the transparent substrate and adapted to prevent reflection of an external light.

10. The filter of claim 9, wherein the external light shielding film is disposed in a side opposite to a side in which the anti-reflection film is formed with respect to the transparent substrate.

11. The filter of claim 8, further comprising: a color correction layer correcting colors of a display image emitted from a panel assembly.

* * * * *